Patented Feb. 20, 1951

2,542,933

UNITED STATES PATENT OFFICE 2,542,933

PROCESS OF MANUFACTURING DRY STARCH PREPARATIONS SOLUBLE IN COLD WATER

Jan Lolkema, Hoogezand, and Willem Albertus van der Meer, Haren, Netherlands, assignors to Naamlooze Vennootschap: W. A. Scholten's Chemische Fabrieken, Groningen, Netherlands, a corporation of the Netherlands No Drawing. Application November 1, 1946, Serial No. 707,324. In the Netherlands November 23, 1944

Section 1, Public Law 690, August 8, 1946
Patent expires November 23, 1964

6 Claims. (Cl. 260—17.3)

It is known in the art of finishing textile materials with the aid of starch, to fix the starch by means of condensation products of aminotriazines, more particularly melamine, with aldehydes, preferably formaldehyde (cf. for example Dutch patent specifications Nos. 45,877 and 47,805), in such a way that it is proof against washing.

For this purpose there is manufactured a starch paste to which the aminotriazine and the formaldehyde, or a precondensate of these substances, as well as a catalyst for the formation of a synthetic resin, more particularly an acid, are added. When a fabric impregnated with the said starch paste is dried or heated, the starch will be fixed in such a way that it will not substantially be removed by washing.

The starch paste is manufactured by gelatinizing the starch with about 10–20 parts of water with heating. If it is desired to obtain a finishing solution that will keep for some time, care should be taken that the said hot starch paste is thoroughly cooled down before adding the aminotriazine, the aldehyde and the catalyst, as the condensation would otherwise proceed very quickly in the solution, so that there would soon be formed a firm gel which could no longer be used as a finishing solution. If desired one may add the aminotriazine either as such or in the shape of a pre-condensation product to the hot starch paste, but in that case care should be taken that the starch paste is thoroughly cooled before the catalyst is added.

It has been proposed in French patent specification No. 826,881 to use for finishing purposes cold swelling starch preparations obtained by converting starch into cold swelling starch in the presence of an aldehyde, preferably formaldehyde. For this purpose a mixture of starch with a small quantity of water to which the aldehyde has been added, is heated for a short time at a temperature above the gelatinizing point, the mass being pressed to form a thin layer and dried simultaneously or immediately afterwards. In order to obtain water resistant layers from the said cold swelling starch preparations, the condensation of the starch with the aldehyde must be completed, which will be the case at higher temperatures and in the presence of catalysts. When using the said finishing agents, they are dissolved in cold water and one will then obtain a solution which when dried on textile materials and the like, will produce insoluble and water resistant layers. In order to improve the water resistant properties of the layers thus formed, the said preparations may be mixed with synthetic resin components, e. g. phenols, urea or urea derivatives.

It has also been proposed in German patent specification No. 741,030 to manufacture dry mixtures consisting of condensation products of aminotriazines with aldehydes and cold swelling starches. These mixtures may also contain ammonium salts and they are used as adhesives for wood.

The invention has for its object a process of manufacturing dry stable starch preparations soluble in cold water to solutions which when dried on the surface of a material in the presence of an acid catalyst for the condensation produce insoluble films, which consists in mixing an aminotriazine having at least two active hydrogen atoms, an aldehyde capable of forming a synthetic resin with said aminotriazine and a cold swelling starch in which the starch molecule is degraded to such an extent, that when dissolved in cold water it will produce a perfectly smooth, viscous, structureless paste.

The term "cold swelling starch" is used for a product obtained by heating a mixture of starch or a starch derivative with a limited proportion of water on a rotary drum to a temperature adapted to remove the water and to gelatinize the starch or starch derivative while pressing out the mass under mechanical pressure to a thin layer which is simultaneously dried.

The term "aldehydes" not only includes the aldehydes themselves, but also compounds yielding aldehydes, such as paraformaldehyde, trioxymethylene and the like.

The acid catalyst for the condensation referred to in the claims is an acid or a substance generating acid when heated.

The aminotriazine and the aldehyde may also be added in the form of a precondensate of the said substance. It is advantageous to use precondensates which are wholly or partly etherified and/or esterified and the term "precondensates" when used in the appended claims is meant to include such etherified and/or esterified precondensates.

Starch degrading substances, suitable for the purpose are e. g. alkalis, oxidizing agents, acids and the like. Compared with the ordinary nondegraded or only slightly degraded cold swelling starches the products used according to the invention, have the advantage that they will dissolve better in water, that they will keep the synthetic resin components or the pre-condensates thereof better in a state of solution or suspension and that they will form a perfectly smooth solution or paste, so that it is possible to obtain e. g. adhesives that may readily be applied by means of a brush in a thin layer, and that may, moreover, contain a larger amount of cold swelling starch without causing too high a viscosity.

Such adhesives, moreover, will blot less and dry faster than ordinary adhesives of the same viscosity manufactured from ordinary cold swelling starches.

By using the preparations according to the invention as glues in the manufacture of three ply or multiply wood, one will obtain far better results than by using adhesives containing non-degraded or less-degraded cold swelling starches.

Impregnating agents for textile materials, paper or the like, manufactured with the aid of the said degraded cold swelling starches will penetrate much better and the designs printed on the said materials will be much clearer.

The above advantages of the decomposed cold swelling starches may also be obtained or improved by completely or partly etherifying and/or esterifying the cold swelling starches e. g. by the process described in French patent specification No. 874,436.

As aminotriazines we may use the compounds described in Dutch Patents Nos. 45,877 and 47,805, more particularly triamino 2.4.6 triazine 1.3.5, the so-called melamine, and the invention will hereinafter be chiefly described with a view to the use of this substance.

We preferably use formaldehyde, which in the above mentioned dry preparations is used in the shape of formaldehyde producing substances, such as para-formaldehyde, trioxymethylene or hexamethylene tetramine. Suitable catalysts are acids or acid producing compounds.

The term "starch or a starch derivative" includes various kinds of native starch, such as potato, tapioca, corn, rice or wheat starch, soluble starches, dextrine, ethers or esters of starch still containing free hydroxy groups and/or mixtures of the said polysaccharides and the like.

The reaction which occurs during the drying of the solution in the heat may be explained as follows:

When an aminotriazine is condensed with an aldehyde, there will first be formed a compound containing methylol groups from melamine e. g. trimethylol or hexamethylol melamine. This is a substance containing two or more reactive OH-groups and which reacts with the cold swelling starch as a polyfunctional etherifying agent in the sense of French patent specifiation No. 881,495. When the reaction takes place, which will be the case when a catalyst, e. g. an acid is added, the desired insoluble compounds will be formed.

In some cases it is possible to add the catalyst e. g. a solid acid or a substance able to produce an acid, already to the dry starch product without a substantial condensation occurring in the dry mixture, whereby the solubility of the produce would be reduced. In order to reduce or to avoid the danger of a premature condensation it will be of advantage in this case to add the catalyst prior to or during the manufacture of the cold swelling starch, so that the catalyst will be embedded in the cold swelling starch particles and that there will be no substantial contact between the synthetic resin components and the catalyst in the dry mixture. This will only be the case when the dry preparation is dissolved in water.

It is also possible to manufacture two cold swelling starch preparations in the manner described in French patent specification No. 826,881 and in copending application Serial No. 707,321, one of the said preparations containing the catalyst and the other the aminotriazine and the aldehyde. If desired either the aminotriazine or the aldehyde may be mixed with the cold swelling starch preparation containing the catalyst, in which case the other preparation is a mixture of cold swelling starch and the other component.

Instead of adding the aminotriazine and the aldehyde as such to the cold swelling starch, a pre-condensate of the said synthetic resin components may be mixed with the cold swelling starch. Such a mixture consisting e. g. of cold swelling starch and trimethylol or hexamethylol melamine will also keep for a long time when dry; a reaction will only occur if the mixture is dissolved in water and heated in the presence of an acid, especially if the solution is dried at a high temperature.

In this case too the catalyst may sometimes be combined already with the dry cold swelling starch preparation, preferably by adding the catalyst prior to or during the cold swelling starch manufacturing process.

The condensation products of the aminotriazine may be used in various stages of condensation, e. g. the initial condensation products that are highly soluble in water or the products having a limited solubility or being insoluble in water; they should not be completely condensed, however, and converted into a resin, and they must still contain a sufficient number of reactive methylol groups for reacting with starch to form water insoluble products.

It has been proposed in Dutch Patents Nos. 45,877 and 47,805, to effect the condensation of the aminotriazines with aldehydes in the presence of alcohols, whereby etherified condensation products of the two resin components are formed. It has been found that the said etherified products possess particular advantages for the present invention, owing to the fact that they do not contain any free hydroxyl groups, or at least contains less free hydroxyl groups than the non-etherified products, so that the chance of the intermediate condensation products of the amino triazine and the aldehyde reacting prematurely with the cold swelling starch as a polyfunctional reagent in the sense of French patent specification No. 881,495, is still further reduced. If, however, the solution of the product is dried on a carrier with the addition of an acid, the alcohol by means of which the intermediate condensation product had been etherified, will be split off and the formation of the insoluble starch compound will proceed in the usual manner.

Owing to their lower reactivity with regard to the cold swelling starch molecules, it is generally possible when using pre-condensates of this kind in which the hydroxyl groups have been blocked up to add the catalyst already to the dry preparation without any risk of the solubility being reduced on account of an initial condensation during the storage of the dry product. This danger is obviated still further, when the catalyst is embedded in the cold swelling starch by adding the catalyst prior to or during the cold swelling starch manufacturing process.

The hydroxyl groups of the pre-condensate may also be blocked up by esterification with an acid.

The above mentioned starch preparations have the property of dissolving in cold water, which has the advantage that there is no danger of a premature formation of insoluble starch compounds in the solution which contains the synthetic resin components or their pre-condensates in the form of a solution, an emulsion or a suspension e. g. in the finishing bath. The process of finishing and sizing in cold baths generally has the disadvantage that the said baths will not penetrate so well into and between the fibres, because of the high viscosity of the said cold solutions. It would therefore be of advantage, if the temperature of the impregnating bath could be raised to e. g. about 50° C., if this were possible without provoking a too far advanced condensation in the impregnating liquid, whereby insoluble products would be formed. This will be the case, if e. g. mixtures already containing an acid as a catalyst are dissolved in warm water. In this case it will therefore be necessary to use preparations that do not yet contain the acid; the acid should then be added separately and immediately before the finishing or sizing treatment, as the warm acid containing finishing or sizing bath will remain fit for use for only a very short time.

This difficulty may now be obviated by adding, in the manner more generally described in Dutch patent application No. 118,566, to the mixture of cold swelling starch, aminotriazine and aldehyde or aldehyde producing substances, or pre-condensates thereof, such a quantity of a non-volatile or only slightly volatile acid and/or of a substance producing an acid when heated, that a solution of the concentration necessary for practical purposes has a pH of at least 5 and will be fit for use when warm for a sufficient long time, while during the drying of the solution on the carrier at a high temperature the acid reaction required for the final condensation will be produced.

This is due to the fact that in this case the acidity of the finishing or sizing bath obtained by dissolving the dry mixture, is so low, that at a temperature of about 50° C. condensation will only proceed very slowly so that the bath remains fit for use for a long time; during the drying treatment at a higher temperature the acidity will, however, be considerably increased, so that at the end insoluble layers will be produced which are very resistant to water. This purpose may be obtained by adding to the dry mixture such a quantity of a non-volatile or only slightly volatile, preferably solid acid that a solution of this mixture in water of the concentration usual e. g. for a finishing bath, will have a pH of about 5 or more; when the said solution is dried on the fabric the degree of acidity of the liquid will increase considerably and will become so high that the condensation of the synthetic resin will be completed at a sufficient rate of speed. For this purpose we may also add substances which in the cold do not show any, or hardly any, acid reaction, but which will produce acid at higher temperature e. g. salts of sulphuric acid esters obtained from alkenes or alcohols, such as e. g. sodium hexylsulphate, various ammonium salts both of strong inorganic and organic, preferably only slightly volatile acids, e. g. oxalate of ammonium, substances having an adsorbing action such as fuller's earth, diatomaceous earths, or synthetic resins which have been treated with an acid and subsequently freed of acid by means of washing with water to such a degree that at a normal temperature and in an aqueous medium they will show almost neutral reaction, but which will produce acids at higher temperatures, etc. We may also add to the dry mixtures, besides acids or acid producing substances, buffering substances such as mixtures of primary and secondary alkali phosphate.

The preparations obtained according to the invention have great advantages for the textile industry, particularly as finishing agents, as the consumer will receive dry products which can be dissolved in cold water to finishing baths, which either as such, or after the addition of an acid will produce excellent waterproof finishes when the fabrics impregnated therewith are dried in the heat.

The products according to the invention may also be used as sizing, thickening and binding agents and as adhesives for all kinds of pulverulent, granular and fibrous materials, as glues for wood or for three ply and multiply wood, as a size for paper, in paper printing, as a binding agent for colouring materials, coal dust etc.

The products according to the invention may also contain starch or starch derivatives that will not swell or dissolve in cold water, which will form a suspension when dissolving the cold swelling starch and which during the drying or heating of the solution will also react with the melamine and the aldehyde, or the precondensate of the said substances.

The invention will be illustrated by the following examples.

*Example 1*

630 parts by weight of melamine are heated while stirring with 1500 parts by weight of a 30% by weight formaldehyde solution at a pH of 7 in a boiling water bath with a reflux cooler until a sample of the liquid when diluted with an equal volume of water will produce a precipitate.

The solution is then dried at a pH of 8 in vacuo at a temperature of from 50° to 60° C., and subsequently ground.

The dry melamine formaldehyde condensation product is intimately mixed with a cold swelling starch obtained by first treating a mixture of 1000 parts by weight of starch and 1000 parts by volume of water in an alkaline medium with 10–100 parts by weight of a 3% hydrogen peroxide solution and subsequently converting the same into cold swelling starch in an approximately neutral or slightly alkaline medium in the usual manner.

*Example 2*

100 parts by weight of a decomposed cold swelling starch which with 3–4 parts of cold water will produce a perfectly smooth paste having a neutral reaction, are mixed with 20 parts by weight of hexamethylol melamine and 4 parts by weight of ammonium oxalate. The mixture is practically stable when stored and with cold water will form a solution that will remain fit for use for a long time, even at moderately elevated temperature, and is very appropriate for the manufacture of wash-resistant-finishes and sizes on textile materials.

*Example 3*

A mixture of 126 parts by weight of melamine and 300 parts by volume of a 30% by volume solution of formaldehyde is heated at a pH of 7 in a boiling water bath with a reflux cooler for 5-10 minutes. It is found that a sample of the reaction mass after cooling is still miscible with water in all proportions. The solution of the condensation product is then adjusted at a pH of 8 and is evaporated in vacuo in a thin layer at a temperature of 50-60° C., after which the dry product is ground.

100 parts by weight of the dry aminotriazine condensation product thus produced are intimately mixed with 500 parts by weight of a hydroxy-ethyl ether of starch obtained according to Example IV of French Patent No. 874,436. The mixture which will keep for a long time when dry will dissolve readily in 10 parts of cold water to a transparent solution which, after the addition of an acid, e. g. phosphoric acid, is very appropriate for obtaining wash-resistant finishes or sizes that will not cloud the designs on dyed or printed textile materials.

*Example 4*

An alkali starch solution is manufactured in the usual manner by intimately mixing 1000 parts by weight of starch with 1000 parts by volume of a hot 3% solution of caustic soda and subsequently diluting the mixture with 40 parts by weight of a 3% solution of hydrogen peroxide. After a reaction period of 45 minutes 125 parts by volume of a 40% solution of a commercial formaldehyde solution are added. The formaldehyde is allowed to react for half an hour; the reaction mixture is then given a pH of 8 by adding hydrochloric acid, and subsequently converted into cold swelling starch in the usual manner. 1000 parts by weight of the hydroxymethylether of starch obtained in this manner that will readily dissolve in 4 parts of cold water to a viscous, perfectly smooth, transparent solution, are intimately mixed with 150 parts by weight of the dry melamine formaldehyde condensation product, obtained according to the preceding Example 3.

We claim:

1. A dry stable starch preparation soluble in cold water to a solution which when dried on the surface of a material in the presence of an acid catalyst for the condensation will produce insoluble films, the said preparation comprising a mixture of a precondensate of melamine and formaldehyde and a hydroxy alkyl ether of cold swelling starch, in which the starch molecule is degraded by the alkaline treatment required for the ether preparation, it being degraded to such an extent that when dissolved in cold water it will produce a perfectly smooth, viscous, structureless paste, the components of said mixture being present in the form of discrete, separate particles.

2. A dry stable starch preparation, according to claim 1, in which the hydroxy alkyl ether is a hydroxy ethyl ether.

3. A dry stable preparation soluble in cold water to a solution which when dried on the surface of a material in the presence of an acid catalyst for the condensation will produce insoluble films, the said preparation comprising a mixture of a precondensate of melamine and formaldehyde, a hydroxy alkyl ether of cold swelling starch, in which the starch molecule is degraded by the alkaline treatment required for the ether preparation to such an extent that when dissolved in cold water it will produce a perfectly smooth, viscous, structureless paste, and a substance generating acid when heated, the components of said mixture being present in the form of discrete, separate particles.

4. A dry stable starch preparation, according to claim 3, in which the hydroxy alkyl ether is a hydroxy ethyl ether.

5. A dry stable starch preparation according to claim 1 in which the acid generating substance is a solid and in admixed form with the hydroxy alkyl ether of cold swelling starch and thereby forming starch coated acid particles.

6. A dry stable starch preparation according to claim 3 in which the acid generating substance is a solid and in admixed form with the hydroxy ethyl ether of cold swelling starch and thereby forming starch coated acid particles.

JAN LOLKEMA.
WILLEM ALBERTUS van der MEER.

REFERENCES CITED

The following references are of record in the file of this patent:

UNITED STATES PATENTS

| Number | Name | Date |
|---|---|---|
| 2,246,635 | Moller | June 24, 1941 |
| 2,275,314 | Pierson | Mar. 3, 1942 |
| 2,318,121 | Widmer | May 4, 1943 |
| 2,400,820 | Glarum | May 21, 1946 |
| 2,408,065 | Hansen | Sept. 24, 1946 |

FOREIGN PATENTS

| Number | Country | Date |
|---|---|---|
| 527,704 | Great Britain | Oct. 15, 1940 |
| 881,495 | France | Jan. 28, 1943 |
| 741,030 | Germany | Nov. 3, 1943 |